United States Patent Office 3,443,923
Patented May 13, 1969

3,443,923
PROCESS FOR PELLETIZING PHOSPHATE ROCK
Erik Qvale Dahl, Kristiansand, Norway, assignor of one-half to W. R. Grace & Co., New York, N.Y., a corporation of Connecticut, and one-half to Elektrokemisk, Inc., Newark, N.J., a corporation of New Jersey
No Drawing. Continuation-in-part of application Ser. No. 623,213, Mar. 15, 1967. This application Nov. 3, 1967, Ser. No. 680,338
Int. Cl. C05b *13/02*
U.S. Cl. 71—33    4 Claims

ABSTRACT OF THE DISCLOSURE

A process for pelletizing phosphate rock comprising: (a) mining and pulping the rock; (b) flowing the pulp to a washing zone; (c) washing, desliming, and grinding the pulp; (d) screening the ground pulp, collecting a fraction having a specific surface area of 7,000–25,000 cm.$^2$/cm.$^3$ and passing a 100 mesh screen, about 50–85% of said fraction passing a 200 mesh screen; (e) partially dewatering and pelletizing said fraction using bentonite or slime from the desliming step as binder; (f) drying the green pellets at about 150–450° C.; and (g) calcining, cooling, and recovering the calcined pellets, all as described hereafter.

---

This invention is a continuation-in-part of copending application Ser. No. 623,213, filed Mar. 15, 1967 and now abandoned.

This invention is in the field of phosphate rock pelletization.

Prior art methods of pelletizing phosphate rock are taught by U.S. Patent No. 2,499,767 and U.S. Patent No. 2,533,027.

In summary, this invention is directed to a process for preparing pelletized furnace grade phosphate rock, said process comprising: (a) mining a phosphate rock-containing matrix; (b) preparing a flowable aqueous pulp of said matrix; (c) flowing said pulp to an ore washing zone; (d) disintegrating the phosphate-containing matrix present in said aqueous pulp; (e) desliming said aqueous pulp by washing said pulp; (f) grinding the deslimed pulp; (g) screening the thus ground pulp to obtain; (i) a first fraction being retained on a 100 mesh screen, which is recycled to the above-recited grinding step; and (ii) a second fraction, said fraction passing a 100 mesh screen and at about 50–85% of said fraction passing a 200 mesh screen, said fraction having a specific surface area of between about 7,000 and about 25,000 cm.$^2$/cm.$^3$; (h) partially dewatering said second fraction to form a thick pulp having a water content of about 9–14%; (i) pelletizing the thick pulp into green pellets having a particle diameter of about 5–25 millimeters in a pelletizing zone wherein about 0.2–2%, dry weight, based on the solid content of the thick pulp, of a binder selected from the group consisting of bentonite clay and slime from the above-recited desliming step is added to the thick pulp; (j) calcining and sintering the green pellets at about 900–1500° C.; (k) cooling the calcined pellets to room temperature; and (l) recovering the cooled calcined pellets.

In preferred embodiments of this invention:

(1) The green pellets have a moisture content of about 8–14%, a drop strength of about 300–600 centimeters, and a compressive strength of about 1–3 kilograms;

(2) The calcined pellets have a porosity of about 23–40%, a use abrasive strength of 70–90% and a compressive strength of about 60–120 kilograms;

(3) The calcined pellets have a porosity of about 28–32%;

(4) The calcined pellets have a diameter of about 10–12 millimeters;

(5) The calcining temperature is about 1,100–1,400° C.; and (6) About 50–60% of the second fraction passes a 200 mesh screen.

In other embodiments this invention is directed to:

(1) A composition consisting essentially of calcined pellets of phosphate rock, said pellets analyzing about 25–42% $P_2O_5$ and containing about 0.2–2% of a binder selected from the group consisting of about minus 300 mesh bentonite and slime obtained by desliming an aqueous pulp made from a phosphate rock-containing matrix, said pellets having a porosity of about 23–40%, an abrasive strength of about 70–90%, and a compressive strength of about 60–120 kilograms; and (2) A composition consisting essentially of calcined pellets of phosphate rock, said pellets analyzing about 30–40% $P_2O_5$ and containing about 0.5–1% of a binder selected from the group consisting of about minus 300 mesh bentonite and slime obtained by desliming an aqueous pulp made from a phosphate rock-containing matrix, said pellets having a porosity of about 28–32%, an abrasive strength of about 70–90%, and a compressive strength of about 60–120 kilograms.

Excellent results have also been obtained where using minus 200 mesh bentonite as binder.

The method of this invention constitutes a new and completely unobvious technical advance over the methods of the prior art because the method of this invention insures the productoin of excellent quality calcined, or sintered, furnace grade pellets of phosphate rock which are excellently adapted for use in the manufacture of elemental phosphorus. Said technical advance results from the fact that, where using the process of this invention to prepare sintered pellets of phosphate rock, the resulting pellets are substantially spherical and free-flowing, said pellets being substantially free of both dust and broken, or fragmented, particles. This unobvious and novel result is only obtained where the pellets are made from a fraction of particles of ground phosphate rock, said particles passing about a 100 mesh screen and being of such size distribution that; (a) about 50–85% of said fraction passes a 200 mesh screen; and (b) the specific surface area of said fraction is between about 7,000 and 25,000 cm.$^2$/cm.$^3$.

In the process of this invention, a phosphate ore matrix is mined with conventional mining apparatus (e.g., draglines, bulldozers, mechanically driven scoops, buckets, shovels, and the like). The thus mined matrix is converted to a flowable pulp by adding water and agitating, preferably by adding water under high pressure from hydraulic guns, hydraulic cannons, hydraulic jets, or the like; however, other well known types of agitating means (e.g., mechanically driven impellers or propellers, or the injection of steam or air, under pressure, into a matrix-water mixture) can be used, but such methods are generally more expensive and less efficient than hydraulic guns, jets, or the like. In some instances the matrix has been broken up with jaw crushers, gyratory crushers, or the like prior to pulping. Excellent results have been obtained where using this technique. The matrix can be converted to a pulp in the field (i.e., at or near the ore deposit from which the matrix was mined) and then pumped to a washing zone (a so-called "washing plant"). If the pulp is prepared at an elevation higher than that of the washing zone, or washing plant, the pulp can flow by gravity to said plant. Alternatively, the mined matrix can be transported (e.g., via truck, railway, ship, or the like) to a position, or location, near the washing plant where said matrix is pulped and pumped or permitted to flow to the washing plant.

Mud balls (i.e., admixtures of clay and sand or admixtures of clay, sand, and phosphate rock particles), if present in the pulp, are decomposed by washing (e.g., in at least one log washer, or by passing the pulp through a trough while directing a plurality of jets of water under high pressure (e.g., ca. 200–2,000 pounds per square inch gauge) onto the pulp, or by using the method described in U.S. Patent No. 3,288,283).

The pulp which has been substantially freed of mud balls, if such were present, by disintegrating said mud balls (without grinding the pulp) is deslimed. Washing and desliming (i.e., removing particles smaller than about 150 mesh U.S. Standard) phosphate ore pulp can be accomplished by passing the pulp into hydroseparators and permitting the slime to overflow, by using cone classifiers, washing boxes, mechanical classifiers, or the like.

The deslimed pulp is ground, preferably in a ball mill; however, rod mills, pebble mills, tube mills, and the like can be used. Grinding can also be accomplished by dewatering the pulp and using a fluid energy or jet mill; however, wet grinding techniques, especially the use of a ball mill, are generally preferred. The ground pulp is screened (preferably wet screened with conventional screening apparatus) to obtain a first fraction, said first fraction being retained on a 100 mesh screen, and a second fraction, said second fraction passing a 100 mesh screen and at least 48–50% (and up to about 85%) of said second fraction passing a 200 mesh screen, said second fraction having a specific surface area of between about 7,000 and about 25,000 $cm.^2/cm.^3$. The specific surface area of the second fraction is determined according to a method developed in Sweden and described by J. Svensson in Jernkontorets Annaler, volume 133, pages 33–86 (1949).

The ground pulp can, if desired, be beneficiated (e.g., by froth flotation, by the use of tables, or by the use of jigs) before or after screening, thereby to increase the $P_2O_5$ assay of pellets obtained by a later-recited pelletizing step.

The aforesaid second fraction is partially dewatered e.g., to 10–20% (preferably 12–15%) moisture content, with cone dewaterers, spiral classifiers, mechanical classifiers, including rake classifiers, and the like. The thus dewatered pulp is pelletized in a rotary drum pelletizer, adding water to the drum where needed. Alternatively, pellets can be formed in a blunger, pug mill, or other pelletizing device. It has been found that incorporating a small amount (e.g., 0.2–2%, preferably about 0.5% calculated on the basis of the dry weight of both binder and solid content of the partially dewatered second fraction) of a binder selected from the group consisting of bentonite clay and slime removed from the aforesaid pulp in the above-recited desliming step facilitate pelletization and increased the strength (resistance to compression and abrasion) of the pellets. On the basis of this disclosure other substantially equivalent binders (e.g., talc, attapulgite clay, and the like) will be readily apparent to those skilled in the art. This process yields pellets which are generally substantially spherical. Although it is possible to prepare pellets of substantially any practical diameter (e.g., from about 0.05–1.5 inch) it is preferred to prepare granules having diameters of about 5–25 mm. or about 10–12 mm.

The thus formed green (wet or moist) pellets are calcined. Calcining can be conducted in a shaft furnace having a temperature of about 900–1,500° C., preferably at about 1,000–1,300° C. or about 1,100–1,400° C. Alternatively, the pellets can be calcined in a rotary kiln, for example by charging the kiln maintained at about 200° C. with green pellets and increasing the temperature of the kiln to about 1,000–1,300° C. at a temperature increase rate of about 800–900° C. per hour. Alternatively, the green pellets can be dried, for example in a stream of hot (e.g., ca. 150–425° C.) air in a rotary drum drier before being passed into the shaft furnace or rotary kiln for calcining within the temperature range of about 1,000–1,400° C.

The calcined granules are removed from the kiln or shaft furnace, cooled to about room temperature (e.g., ca. 20–30° C.) and recovered.

The aforesaid second fraction cannot have a specific surface area higher than about 26,000 $cm.^2/cm.^3$ because pellets made from a second fraction having a higher specific surface area will have very small pore openings. Such pellets will explode on drying because of internal water vapor pressure in such pellets. It has been found that acceptable pellets cannot be prepared, even where the specific surface area of the second fraction is within the necessary range if less than about 48–50% of said fraction passes a 200 mesh screen or if more than a trace (e.g., ca. 0.5–2%) of said fraction is retained on a 100 mesh screen.

Calcined pellets made by the process of this invention have a porosity of about 23–40% by volume, preferably about 28–32%. The porosity is calculated from the apparent and true densities of such pellets. The apparent density is determined by measuring the buoyancy of the pellets in mercury, and the true density is determined by means of an air comparison pycnometer.

Calcined pellets made by the process of this invention have an abrasive strength of about 70–90%.

The drop strength is the height from which a number of pellets (e.g., 40–50 pellets can be dropped with less than 50% breakage i.e., less than half of the dropped pellets are broken).

The compressive strength of calcined pellets made by the process of this invention is about 60–120 kilograms. The compressive strength is measured by loading a pellet until it breaks; the mean value of 10–20 single measurements is reported for each lot of pellets tested.

The abrasive strength is measured by tumbling a 150 ml. volume of pellets in a drum 20 centimeters in diameter by 10 centimeters deep and fitted with four ribs on the inner periphery, rotated at such a rate as to perform 5000 revolutions in 2 hours. The abrasive strength is that fraction of the pellets which, after tumbling, are retained on a +1 millimeter sieve.

Dewatering can be accomplished with conventional apparatus such as screw classifiers, cone dewaterers, mechanical classifiers, and the like. An equivalent result can be obtained by adding dry material (e.g. dry ground pebbles or returned fines from the sintering plant).

Green pellets (wet or moist pellets prior to drying or calcining) made by the process of this invention have a moisture content of about 8–14%, a drop strength of about 300–600 centimeters, and a compressive strength of about 1–3 kilograms.

It is understood that the following specific examples, which are offered merely as illustrations, do not limit the scope of this invention. It is also understood that modifications can be made without departing from the spirit of this invention. For example, instead of recycling the first (+100 mesh) fraction to the grinding step said fraction can be sent to an ore flotation plant, or to a superphosphate plant, or to a wet process phosphoric acid plant.

EXAMPLE I

A phosphate matrix was mined from a deposit of pebble phosphate ore using a dragline, the thus mined matrix was pulped at the mine site with a jet of water from a hydraulic gun to produce a pulp having a solid content of about 30–35%. Said pulp was pumped to a washing plant where it was freed of mud balls by washing in log washers and deslimed (freed of particles passing about a 150 mesh screen) by passing through cyclone separators. The overflow (containing the slime) was sent to a tailing pond, and the underflow was passed to a ball mill where it was ground. Pulp exit the mill was screened while wet to yield: (a) a first fraction retained on a 100 mesh screen; and (b) a second fraction passing the 100 mesh screen. The first fraction was recycled to the ball mill, and the second fraction was selected for further processing.

A representative sample of the aforesaid second fraction was tested in the laboratory for particle size and specific surface area. It was found that all of said second fraction passed a 100 mesh screen, 57% of the fraction passed a 200 mesh screen, and that the specific surface area of said fraction was 23,500 cm.$^2$/cm.$^3$.

The second fraction was partially dewatered in a cone dewaterer to form a thick pulp having a moisture content of about 9% and passed into a rotary drum pelletizer where it was pelletized by rotating in the presence of a binder (i.e., about 0.5% of fine (minus 300 mesh) bentonite (dry weight of binder calculated on the basis of the dry weight of the solid particles present in the thickened pulp)). Green pellets exit the pelletizer had a moisture content of 11.6%, a drop strength of 500 centimeters, and a compressive strength of 1.5 kilograms. The green pellets were calcined in a shaft furnace maintained at about 1,400° C. The calcined, or sintered pellets were cooled and recovered. The recovered pellets were free-flowing substantially spherically particles having a diameter of about 10–12 millimeters.

The recovered pellets were substantially dust free and had a porosity of 33%, an abrasive strength of 78%, and a compressive strength of 120 kilograms. Said pellets were furnace grade pellets of excellent quality and were excellently adapted for use in the preparation of elemental phosphorus, phosphoric acid, or superphosphate fertilizers.

EXAMPLE II

The general procedure of Example I was repeated. However, in this instance 0.5% slime (dry basis) removed from the pulped matrix in the desliming step was used as binder in place of the bentonite. The green pellets had a moisture content of 12%, a drop strength of 600 centimeters, and a compressive strength of 2.5 kilograms. The green pellets were calcined by rotating in a rotary kiln. The pellets were charged into the kiln at a kiln temperature of about 200° C. The kiln was then heated to about 1,200° C. increasing the temperature at the rate of about 800° C. per hour.

The recovered calcined pellets were of excellent quality and had a porosity of 31.7%, an abrasive strength of 87% and a compressive strength of 103 kilograms.

EXAMPLE III

The general procedure of Example I was repeated. However, in this instance the specific surface area of the particles comprising the second fraction of pulp was about 33,000 cm.$^2$/cm.$^3$; all of said fraction passed a 100 mesh screen and about 65% passed a 200 mesh screen.

The green pellets had a moisture content of 13%, a drop strength of 550 centimeters, and a compressive strength of 1.6 kilograms. Calcining these green pellets gave calcined pellets of poor quality. Said calcined pellets were contaminated with dust and broken particles of pellets because at least 20–30% of the pellets present had exploded (were blown apart by water vapor formed internally during calcining) during the calcining step.

EXAMPLE IV

The procedure of Example II was repeated. In this instance the specific surface area of the particles comprising the second fraction was about 12,500 cm.$^2$/cm.$^3$, all of said particles passed a 100 mesh screen and 77% passed a 200 mesh screen. Green pellets prepared in this example contained 12.7% moisture and had a drop strength of 600 centimeters and a compressive strength of 2 kilograms. These green pellets were calcined. The resulting calcined pellets, after cooling and recovering were of excellent quality; they had a porosity of 34%, an abrasive strength of 85% and a compressive strength of 95 kilograms.

EXAMPLE V

An attempt was made to pelletize a second fraction having a specific surface area of 13,000 square centimeters per cubic centimeter and being of such size that all of said fraction passed a 100 mesh screen but only 39% of said fraction passed a 200 mesh screen. It was not possible to pelletize said fraction.

As used herein, unless otherwise defined where used, the term "percent" (%) means percent (parts per hundred) bp weight, the term "mesh" means mesh size on the U.S. Standard scale, the term "cm.$^2$/cm.$^3$" means square centimeters per cubic centimeter, and the term "mm." means millimeter or millimeters.

What is claimed is:

1. A process for preparing pelletized furnace grade phosphate rock, comprising:
    (a) wet screening a ground deslimed phosphate rock are pulp to obtain a fraction passing a 100 mesh screen with about 50–85% of said fraction passing a 200 mesh screen, said fraction having a specific surface area of between about 7,000 and about 25,000 cm.$^2$/cm.$^3$;
    (b) partially dewatering said fraction to form a thick pulp having a water content of about 9–14%;
    (c) mixing said thick pulp with aobut 0.2–2%, dry basis, of a binder selected from the group consisting of bentonite clay and slime obtained by desliming a phosphate rock ore pulp;
    (d) pelletizing, in a pelletizing zone, the thus formed mixture of thick pulp and binder into green pellets having a particle diameter of about 5–25 millimeters, a drop strength of about 300–600 centimeters, and a compressive strength of about 1–3 kilograms;
    (e) drying the green pellets at about 150–425° C.;
    (f) forming cooled, calcined, sintered pellets having a porosity of about 23–40%, an abrasive strength of about 70–90%, and a compressive strength of about 60–120 kilograms by calcining and sintering the dried pellets at about 900–1500° C. and cooling the thus calcined and sintered pellets; and
    (g) recovering the cooled, calcined, sintered pellets.

2. The process of claim 1 wherein the calcining temperature is about 1,000–1,300° C.

3. The process of claim 1 wherein the calcined and sintered pellets are cooled to about 20–30° C. before being recovered.

4. The process of claim 1 wherein the thick pulp is mixed with about 0.5–1% of the binder.

References Cited

UNITED STATES PATENTS 2,533,027   12/1950   Maust et al. _____ 71—44

S. LEON BASHORE, *Primary Examiner.*

T. G. FERRIS, *Assistant Examiner.*

U.S. Cl. X.R.

71—44, 47, 64